Jan. 5, 1971    A. N. TSERGAS ET AL    3,553,581
TESTER FOR APPLYING A PLURALITY OF TESTS
TO AN ELECTRICAL APPLIANCE
Filed Jan. 31, 1968    3 Sheets-Sheet 3
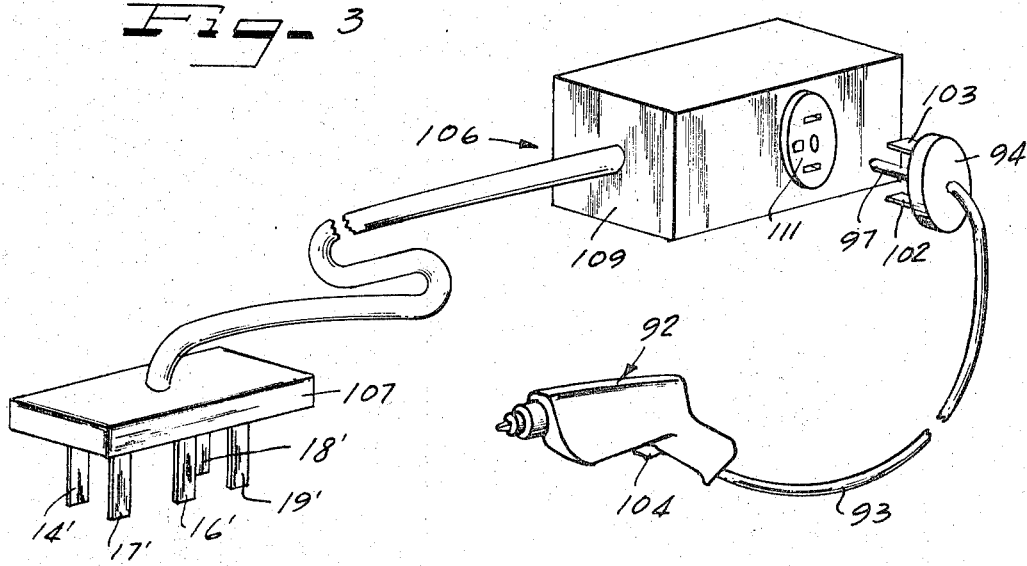
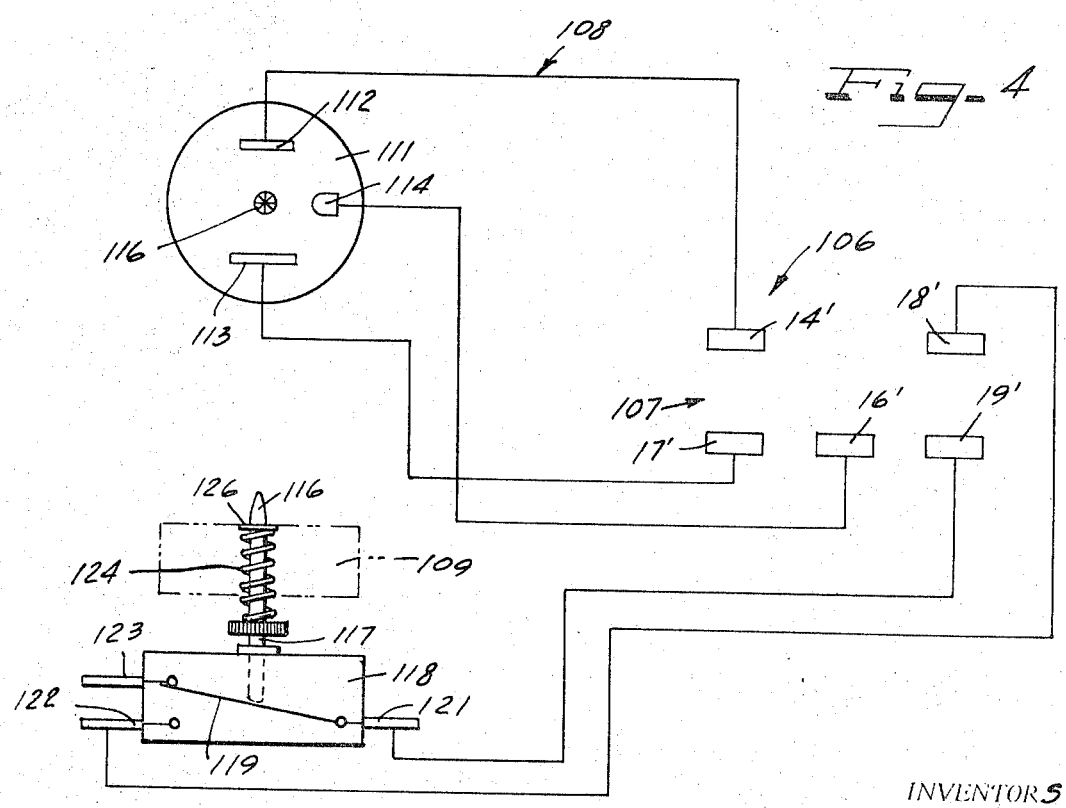
INVENTORS
ATHANASE N. TSERGAS
WALLACE T. PROCIK
BY  Hill, Sherman, Meroni, Gross & Simpson
ATTORNEYS United States Patent Office 3,553,581
Patented Jan. 5, 1971

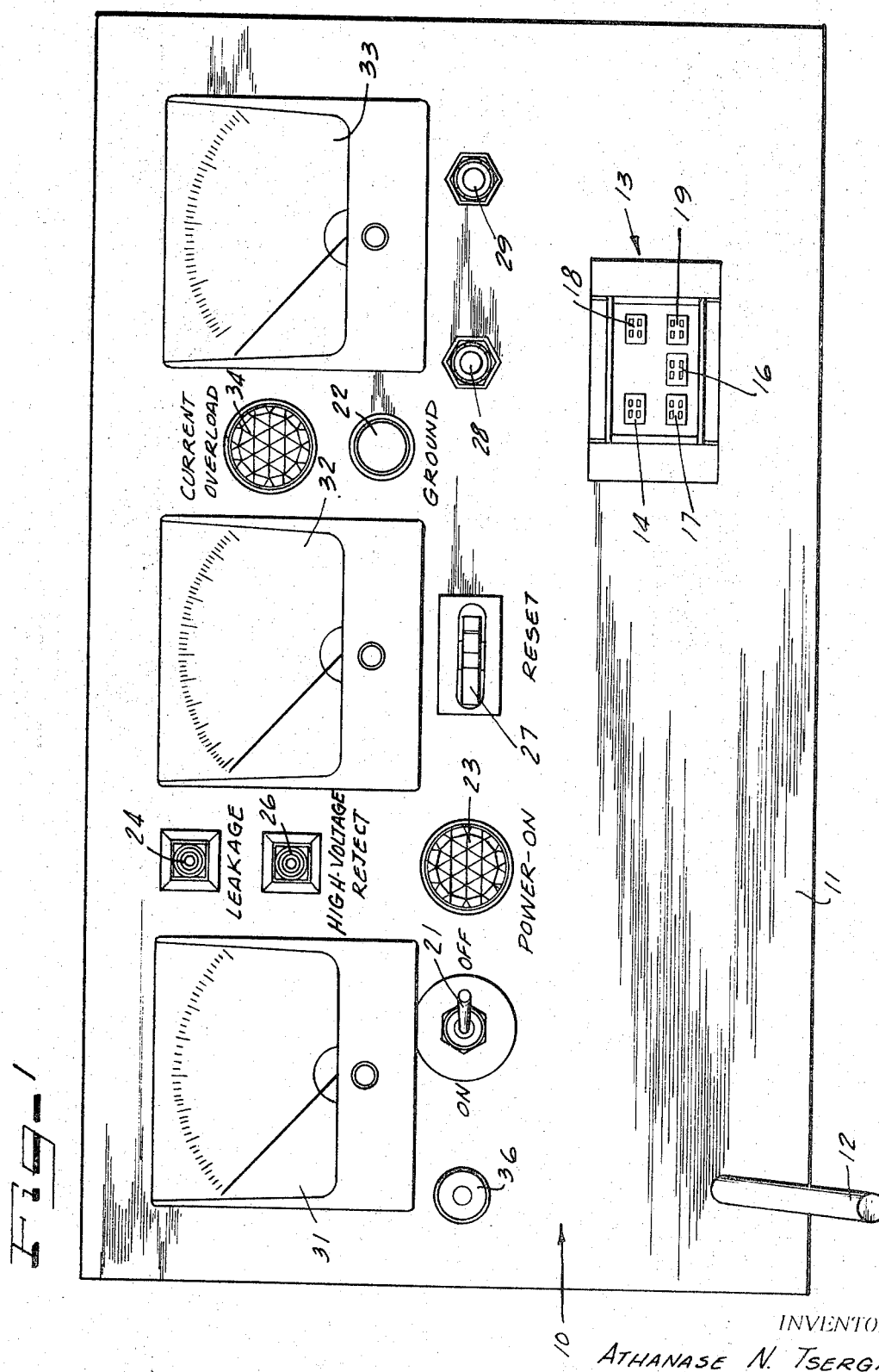

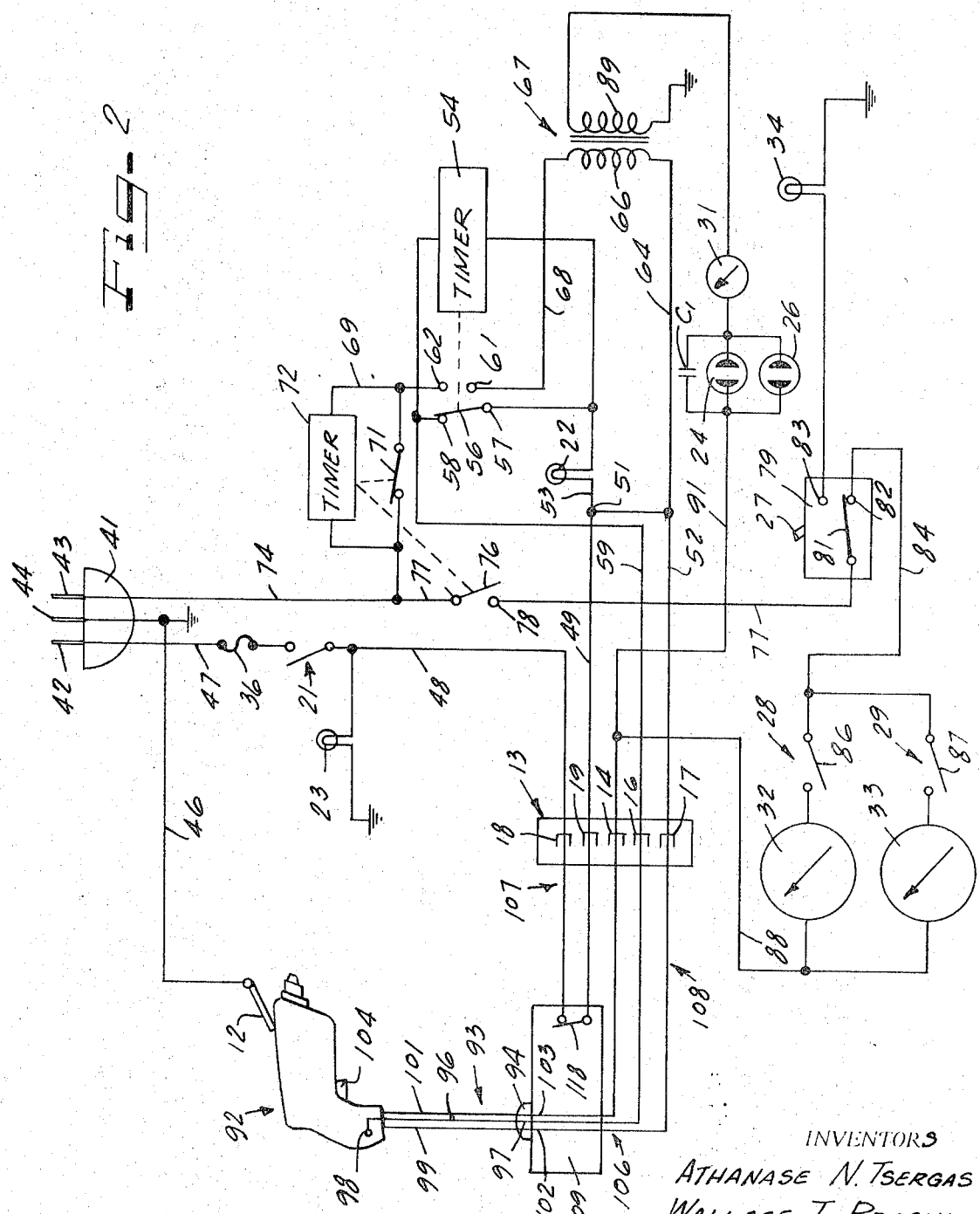

3,553,581
TESTER FOR APPLYING A PLURALITY OF TESTS TO AN ELECTRICAL APPLIANCE
Athanase N. Tsergas, Des Plaines, and Wallace T. Procik, Harwood Heights, Ill., assignors to Ram Tool Corporation, Chicago, Ill., a corporation of Illinois
Filed Jan. 31, 1968, Ser. No. 701,986
Int. Cl. G01r 31/28, 31/02
U.S. Cl. 324—158                    1 Claim

ABSTRACT OF THE DISCLOSURE

A tester capable of testing electric motors or other electrical devices so as to assure that a grounded contact exists in the device and also to assure that the rotor and stator of the motor are not grounded or shorted to the case. The tester automatically operates in a time sequential manner so as to operate the appliance and subject it to the various tests so as to allow a large number of appliances to be processed in an efficient manner.

BACKGROUND OF THE INVENTION

Field of the invention

The invention relates in general to testing devices and in particular to a testing device for an electric motor or other appliance which is capable of automatically testing a motor, for example, to see if it has a grounded feed-in lead and also to test to see if either of the power lines are shorted or open. The tester operates automatically in a timer sequential basis so that the tests are performed rapidly and accurately.

Description of the prior art

Although testing devices for electric motors and other electrical appliances have been known, they have generally performed one test and required the operator to move the appliance from first to a series of testers which requires a substantial period of time to completely test a motor or other electrical appliance. The present invention automatically and in time sequence tests a motor or other appliance so as to determine automatically whether the motor meets a number of criteria.

SUMMARY OF THE INVENTION

The present invention allows an electrical motor or other appliance with a grounded lead to be plugged into a female socket and to automatically start a testing sequence which first consists of testing the motor for ground. If a ground does not exist, the appliance is faulty and a reject indicator is actuated. If the appliance has a good ground, a time delay device disconnects the ground test and actuates a high voltage test to the power leads to determine if the appliance has either a shorted controlling element or a grounded element. The tester will also indicate if a leakage path exists which shows that although a direct short may not be present an undesirable weak point exists somewhere in the appliance. If the appliance passes the ground and high voltage tests, an operating voltage is applied to it and the operating characteristics of the device are observed. Of course, if the appliance passes all three of these tests, it is a good appliance and will be ready to be shipped. Since the tester operates automatically on a time sequential basis, once it has been plugged in to the tester the operator need merely observe the various indicators to test the device. Thus, relatively unskilled help can be used for testing complicated electrical appliances.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a front panel view of the tester of this invention;

FIG. 2 is a schematic view of the electrical circuitry of the tester;

FIG. 3 is an enlarged detailed view of the electrical extension cord of the tester; and FIG. 4 is a schematic view of the extension cord of the tester.

DESCRIPTION OF THE PREFERRED EMBODIMENTS

FIG. 1 illustrates the testing device of this invention which has a chassis designated generally as 10 with a front panel 11. A grounding pin 12 extends outwardly from the testing panel 11. A female plug-in socket 13 is formed on the front panel and has a number of electrical contacts 14, 16, 17, 18 and 19 respectively. An on-off switch 21 is mounted on the front panel and a ground indicator 22, which might, for example, be a light, is also mounted on the front panel. A power-on light 23 is mounted by the on-off switch 21. A leakage light 24 is mounted on the front panel as is a high voltage reject light 26. A reset switch 27 for a circuit breaker is also mounted on the front panel. A pair of manual switches 28 and 29 are also mounted on the front panel. A high voltage meter 31, a low amperage meter 32 and a higher amperage meter 33 are also mounted on the front panel. A current overload light 34 is also mounted on the face of the tester. A fuse 36 is also mounted in the tester.

FIG. 2 is a schematic illustration of the tester of this invention and illustrates a power plug 41 which has a pair of power prongs 42 and 43, and a ground prong 44. The ground 44 is electrically connected to the chassis and is connected by a lead 46 to ground prong 12. Power prong 42 is connected by lead 47 to fuse 36. The on-off switch 21 is connected to the fuse and the indicator light 23 is connected in series with the switch 21. The other side of power-on light 23 is connected to ground. The on-off switch is also connected to a lead 48 which is connected to the female contact 18 of socket 13. Female contact 19 is connected by a lead 49 to a junction point 51. The lead 52 connects junction point 51 to female contact 17 of plug 13. Ground indicator light 22 is connected by lead 53 to lead 49. A timer 54 is connected to the other side of ground light 22 and controls a movable switch contact 56 which, in a first position, engages switch contacts 57 and 58, and in a second position engage contacts 61 and 62. Contact 57 is connected to one side of the ground light 22. Contact 58 is connected by lead 59 to female contact 16 of socket 13. Point 51 is also connected by lead 64 to the primary 66 of a transformer 67. The other side of primary 66 is connected by lead 68 to contact 61. Contact 62 is connected by lead 69 to a switch 71 and to a timer 72. The other side of the timer 72 and contact 73 of switch 71 are connected by lead 74 to the power prong 43 of plug 41. Timer 72 controls switch 71 and a switch 76. Switch 76 is connected by lead 77 to lead 74. A contact 78 of switch 76 is connected to a circuit breaker 79 which has a movable contact 81 that engages contact 82 or 83. Reset button 27 moves switch contact 81 from engagement with contact 83 to engagement with contact 82 if an overload occurs. Overload light 34 is connected to contact 83 and has its opposite side connected to ground. Contact 82 is connected by lead 84 to contacts 86 and 87 of switches 28 and 29 respectively. Switch 28 is connected to operating meter 32 and switch 29 is connected to operating meter 33. The other sides of meters 32 and 33 are connected to lead 88 which is connected to contact 14 of female socket 13. The secondary 89 of transformer 67 has one side connected to ground and the other side connected to the high voltage meter 31. The other side of the high voltage meter 31 is connected to the parallel combination of a capacitor $C_1$ and indicator lights 24 and 26. The other side of the parallel combination of the indicator lights and the capacitor $C_1$ are connected by lead 91 to contact 14 of the socket 13.

A motor or other applicance to be tested 92 is held to engage the grounding pin 12 and has an extension cord 93 which is connected to male plug 94. The cord 93 includes a grounding lead 96 which is connected to plug 97 of the plug 94 and which has one end grounded at point 98 to the case of the motor 92. It is to be realized, of course, that the motor 92 may be a hand drill or other electrical applicance. Power leads 99 and 101 are also in extension cord 93 and are connected respectively to power prongs 102 and 103 of plug 94. The drill 92 also has a on-off switch 104.

As best shown in FIGS. 3 and 4, an actuator extends between female socket 13 and the plug 94 of the tool 92. As shown in the figures, the actuator 106 comprises a male plug 107 which is received in the female socket 13. The male socket 107 has prongs 14′, 16′ 17′, 18′ and 19′ which respectively engage contacts 14, 16, 17, 18 and 19 of the female socket 13. An extension cord 108 extends from the plug 107 to a plug-in box 109 of the actuator.

The box 109 has a female socket 111 into which the plug 94 of the tool being tested 92 is inserted. Power contact 112 and 113 are mounted in socket 111 and grounding contact 114 is also mounted in the socket 111. An actuator pin 116 is movably mounted in the socket 111 and extends downwardly into the socket box 109 to engage an actuating button 117 of a switch 118. The switch 118 has a movable contact 119 which is controlled by the actuator button 117 which has one end connected to a common 121 which is connected through the extension cord 108 to contact 19′ of the plug 107. A contact 122 is normally opened when the plug of the tool is not in the socket 111 and is connected to the contact 18′. A spring 124 engages a collar 126 on actuator pin 116 and biases the actuator pin outwardly from the socket box 109 so that the switch 118 is in the position shown in FIG. 4 when the plug of the tool is not in the socket 111.

In operation, the plug 41 of the tester will be mounted in a suitable power outlet. The on-off switch 21 will be closed by the operator and the on-light 23 will be illuminated, to indicate that the tester has been turned on. To test a drill 92 or other appliance, the operator selects a drill to be tested and moves it into contact with the grounding pin 12 on the face of the tester. The plug 107 of the actuator 106 has previously been inserted into the socket 13 of the tester. The plug 94 of the drill 92 is inserted into the socket box 109. As this occurs the plug 94 engages the actuator pin 116 and moves it down against the spring 124 so that the actuator pin engages the contact 117 of the switch 118 and moves contact 119 into engagement with contact 122. This completes a circuit between leads 48 and 49 of the tester, and ground light 22 will be illuminated if a proper ground exists in the tool 92. The ground circuit will be from the prong 42 through the switch 21, the switch 118, the ground light 22 through contact 57, switch 56, contact 58 to female contact 16. The circuit will then go through the extension cord 106 to the socket box 109 and engage the grounded prong 97 of plug 94. If the ground prong 97 is properly grounded through lead 96 to the case of the tool 92, the circuit will be completed from the case of the tool through the grounded pin 12 which returns to ground by lead 46. Thus, if a suitable ground exists the light 22 will be illuminated and the test will continue. The timer 54 is in parallel with the contacts 57 and 58 and will also be energized. The timer 54 is a time delay actuator which may comprise a bimetallic device, for example, which is energized after current has passed through it for a predetermined time. When the timer 54 is energized, it moves contact 56 from engagement with contacts 57 and 58 and into engagement with contacts 61 and 62. This supplies power to the primary 66 of the transformer 67 to energize the high voltage test. Simultaneously, the timer 72 will be energized upon the engagement of switch contact 56 with contacts 61 and 62. Timer 72 is similar to timer 54 and will allow switch 71 to remain closed and switch 76 to remain open for a predetermined time as, for example, two seconds. After that time, it will open switch 71 and close switch 76. While switch 71 remains closed the high voltage secondary 89 will supply suitable high voltage, as for example, 1500 volts through the meter 31, the parallel lights 24, 26 and condenser $C_1$ through lead 91 to the contact 14 and through the cable 108 of the actuator and to the power lead 101 of the drill 92. The lead 101 would be connected to the field and armature of the motor of the drill 92 and if there is either a short or leakage from the armature and field winding or any other circuitry of the motor to the case of the drill, a circuit will be completed through the pin 12, lead 46 to ground. It is to be particularly noted that the other side of the secondary 89 is grounded and if a short or leakage occurs, current will flow through lead 91. If a small amount of current flows to lead 91, this indicates that leakage occurs and one of the lights 24 will be illuminated. If a short exists in the drill 92, a large amount of current will flow to lead 91 and the lights 24, 26 will both be illuminated.

If neither lights 24, 26 come on the motor has passed the high voltage leakage and short test. The timer 72 is actuated after a relatively short time as, for example, two seconds, and opens switch 71 and closes switch 76. Power will then be supplied through lead 52 to prong 102 of plug 94 and to power lead 99 of the drill 92, and to lead 101 through prong 103 and lead 88. The switch 87 may be closed to initially start the drill 92 and the switch 76 will be closed by the timer 72 so the power circuit will be completed through lead 77 and to prong 43 of the plug 41. The switch 28 may be closed to indicate the operating voltage on meter 32 of the electrical appliance. If excessive current is drawn by the drill 92 the circuit breaker 79 will open the switch contact 81 and turn off the circuit to the drill. When this occurs, the contact 81 will engage the contact 83 which will illuminate light 34.

Thus, the invention provides means for indicating if a ground exists in the drill on the grounded lead. If a ground does exist, the light 22 is illuminated and the tester automatically applies a high voltage to the field and winding of the motor of the drill to see if a short or leakage exists. If a short or leakage exists, this is indicated by the lights 24 and 26 and if no leakage or shorts exist, the device automatically proceeds to the next test. If the circuit breaker 79 opens due to excessive current being drawn by the drill under normal operating conditions the circuit breaker will open and the light 34 will come on thus indicating this condition. The circuit breaker may be reset by the lever 27 when a new drill is tested. The surge current and operating current are indicated by the meters 33 and 32 respectively.

Although minor modifications might be suggested by those versed in the art, it should be understood that we wish to embody within the scope of the patent warranted herein all such modifications as reasonably and properly come within the scope of our contribution to the art.

Sometimes the ground wire 96 is a multi-strand wire and only a few strands are grounded at 98. The high voltage ground test supplies sufficient current to burn out a few strands of wire and the device does not pass the ground test. If all strands are grounded, the wire will not burn out and the device passes the ground test.

We claim as our invention:

1. A tester for performing a grounded test, a high voltage short and leakage test and an operate test for an electrical device having power leads and a lead intended to be grounded to its case and having a grounded contact including an interlock switch to which the power leads and lead intended to be grounded of the electrical device may be connected, an actuator forming a part of the interlock switch and adapted to be operated by connection of the electrical device to the interlock switch comprising a grounding test circuit in said tester including means for connecting power to said electrical device between one of said power leads and said lead intended to be grounded after the case of said device has been placed in engagement with said grounded contact through said interlock switch, an indicator connected in circuit with said lead to be grounded to indicate a proper ground, indicating that said electrical device is properly grounded, a first time delay actuator connected in circuit with said grounding test circuit and energized after a predetermined time if the case of said device is properly grounded, a first switch controlled by said first time delay actuator, a high voltage test circuit in said tester energized by said first switch and said first time delay actuator to apply a potential substantially higher than normal operating voltage between one of said power leads and ground through said interlock switch to test for shorts or leakage and including means for indicating shorts or leakage, comprising a pair of neon indicators in parallel and a condenser in parallel with said neon indicators, a second time delay actuator connected in circuit with said high voltage test circuit and energized after said high voltage test circuit has been energized a predetermined time if the device has no shorts or leakage, second and third switches controlled by said second time delay actuator, an operate voltage test circuit energized by said second switch and said second time delay actuator to apply standard operate voltage to said power leads for an operate test through said interlock switch, and said third switch in parallel with said second time delay actuator and controlled thereby and indicating means connected in said operate voltage test circuit to indicate the operating characteristics of said device.

References Cited
UNITED STATES PATENTS

| | | | |
|---|---|---|---|
| 2,806,993 | 9/1957 | Matousek | 324—51 |
| 3,141,128 | 7/1964 | Behr | 324—51 |

RUDOLPH V. ROLINEC, Primary Examiner

E. F. KARLSEN, Assistant Examiner

U.S. Cl. X.R.

324—51, 73